United States Patent [19]
Apple et al.

[11] Patent Number: 5,247,406
[45] Date of Patent: Sep. 21, 1993

[54] TAPE CARTRIDGE MAGAZINE

[75] Inventors: James L. Apple, Boulder; Ronald L. Campbell, Thornton; Paul Kummli, Boulder, all of Colo.

[73] Assignee: Storage Technology Corporation, Louisville, Colo.

[21] Appl. No.: 737,783

[22] Filed: Jul. 30, 1991

[51] Int. Cl.$^5$ .............................................. G11B 15/68
[52] U.S. Cl. ........................................ 360/92; 360/71; 360/98.04; 369/34
[58] Field of Search ................... 360/92, 71, 98.01, 91, 360/97.03, 98.04, 94, 96.5; 369/34, 178, 192, 194

[56] References Cited

U.S. PATENT DOCUMENTS

| | | | |
|---|---|---|---|
| 4,864,438 | 9/1989 | Munro | 360/92 |
| 4,912,575 | 3/1990 | Shiosaki | 360/92 |
| 5,004,393 | 4/1991 | Lunka et al. | 414/331 |
| 5,038,235 | 8/1991 | Ohzawa et al. | 360/92 |

Primary Examiner—David P. Porta
Attorney, Agent, or Firm—Duft, Graziano & Forest

[57] ABSTRACT

A magazine for handling a plurality of tape cartridges. The magazine includes a plurality of vertically spaced, parallel shelves having tapered front edges with notches formed therein for ease of tape cartridge insertion. The slots slant downward to precisely position and restrain the tape cartridges magazine. A rib extends through each slot to engage in a tape cartridge notch. Improperly inserted tape cartridges will be forced to extend further out of the magazine so that they will be easily identified. A handle formed on the upper end of the front face of the magazine causes the lower end of the magazine to pivot forward to restrain the tape cartridges from accidental dislodgement. A locking strap is also provided to prevent the tape cartridges from accidentally dislodging from the magazine.

18 Claims, 4 Drawing Sheets

TAPE CARTRIDGE MAGAZINE

FIELD OF THE INVENTION

The present invention relates to field of magazines for handling of a plurality of tape cartridges, particularly in automated tape cartridge library systems.

PROBLEM

Tape cartridges, particularly in tape cartridge library systems, are typically handled individually, when being loaded, retrieved or transported. This can be cumbersome and time-consuming, in instances where large numbers of tape cartridges are involved, such as in tape cartridge libraries. For instance, in tape cartridge libraries the tape cartridges are loaded and removed through a device, such as a cartridge access port, one at a time. Also, these tape cartridges must frequently be moved on and off-site on a daily basis, thus necessitating further handling of the tape cartridges.

Often the tape cartridges are loaded in a sequential order. This order can easily be disrupted in handling the tape cartridges individually. Transporting these tape cartridges individually can also lead to disruption of the order of sequence of the tape cartridges.

The tape cartridges are susceptible to abuse and damage when handled and transported individually. This can lead to loss of the data that was stored on the cartridges.

The tape cartridges loaded into automated tape cartridge library systems must, by necessity, be in proper orientation for the robotics to be able to transfer the tape cartridges. However, in loading the tape cartridges in the library individually, the tape cartridges are easily misaligned, which can create problems for the robotics in transferring them.

Therefore, a need exists for a method of efficiently handling the tape cartridges, not only for loading into and out of a tape cartridge library, but in transporting on and off site.

SOLUTION

The present invention solves these and other problems by providing a magazine for carrying a plurality of tape cartridges. The magazine of the present invention holds a plurality of cartridges for transporting and for loading into library systems.

The present invention also provides a magazine that can be loaded directly into a cartridge access port thus eliminating the need for individually loading tape cartridges.

The magazine of the present invention also allows the tape cartridges to be loaded in a predetermined sequential order.

The magazine of the present invention presents the tape cartridges in proper orientation to assist the loading and removal of the cartridges by the robotics of an automated system.

The magazine of the present invention provides protection of the tape cartridges during transporting of the magazine.

The magazine of the present invention also provides a mechanism for locking the tape cartridges into the magazine during the transportation of the magazine.

The magazine of the present invention provides a reference target for the robotics to precisely align with for accessing the tape cartridges.

The present invention solves these and other problems by providing a magazine as further described in the drawings and the detailed description of a preferred embodiment.

SUMMARY OF THE INVENTION

The present invention provides a magazine for handling a plurality of tape cartridges. The magazine, of a preferred embodiment, is an upstanding, substantially rectangular structure having a plurality of vertically spaced, parallel shelves forming slots for holding tape cartridges. The magazine is preferably formed of a black one-piece injection molded polycarbonate material for abrasion and wear resistance.

The front edge of each of the shelves is tapered to create a "funnel"-like insertion area at the front of each slot. This improves the ease of insertion of the tape cartridges in the slots. Notches are formed in each front edge of the shelves to provide clearance for the tape cartridge handling mechanism as well as the fingers of the person loading or unloading the tape cartridges in the magazine. The front edges of the shelves are substantially horizontal to form a stable platform for inserting the tape cartridges. The shelves then slant downward, at about ten degrees. This slant performs two functions. First, it precisely positions the tape cartridges to the rear of the slots by the force of gravity. Second, it restrains the tape cartridges from accidentally dislodging from the magazine due to the force of gravity.

A rib extends through each slot to provide a "keying" feature. The rib engages in a notch formed on each tape cartridge when the tape cartridge is properly inserted. If the tape cartridge is improperly inserted, the rib will not engage in the tape cartridge notch, thus forcing the tape cartridge to extend further out of the magazine than the properly inserted tape cartridges. This can be quickly identified by a visual check and corrected.

A handle is formed on the upper end of the front face of the magazine. The magazine can be lifted and transported by this handle. When the magazine is lifted by the handle, the center of gravity of the magazine will cause the lower end of the magazine to pivot forward. This will restrain the tape cartridges from accidental dislodgement from the magazine.

A locking strap is also provided to prevent the tape cartridges from accidentally dislodging from the magazine. The locking strap has end portions with locking hooks which snap engage over ledges formed on the upper and lower ends of the magazine. When secured on the magazine, the locking strap will extend across the front face of the magazine to restrain the tape cartridges loaded in the magazine from accidental dislodgement.

The magazine has removable target inserts affixed on the front face of the magazine. There are a plurality of target inserts to handle a plurality of robotic devices. An optical sensing device on the robotics of an automated tape cartridge library can scan the target inserts to align the tape cartridge handling mechanism of the robotics with the magazine.

The magazine can be loaded directly into a cartridge access port in an automated tape cartridge library system without the need for individual handling of the tape cartridges. Mounting hooks are formed on the rear of the magazine for attachment in the cartridge access ports.

DETAILED DESCRIPTION

The present invention provides a magazine for handling a plurality of tape cartridges. The magazine is able to transport a plurality of tape cartridges and also to be loaded directly into a tape cartridge library to eliminate the need for individually loading and unloading of the tape cartridges. Further, the magazine provides alignment features to reduce the occurrence of misaligned tape cartridges as well as orienting the tape cartridges for ease of access, not only for robotics in automated tape cartridge systems but for manually loading and unloading the tape cartridges in the magazine. The magazine also provides safety features to protect the tape cartridges from damage during transporting on and off site.

The description of a possible preferred embodiment is for explanatory purposes only and is not meant to limit the scope of the claimed invention. Other embodiments and modifications are considered to the be within the claimed inventive concept.

The magazine of the descriptive preferred embodiment has particular application in automated tape cartridge library systems, such as the library system disclosed in U.S. Pat. No. 4,864,438, issued to Munro. However, the claimed invention is not meant to be limited to this particular application but encompasses other applications in which the claimed invention has merit.

Figure 1:
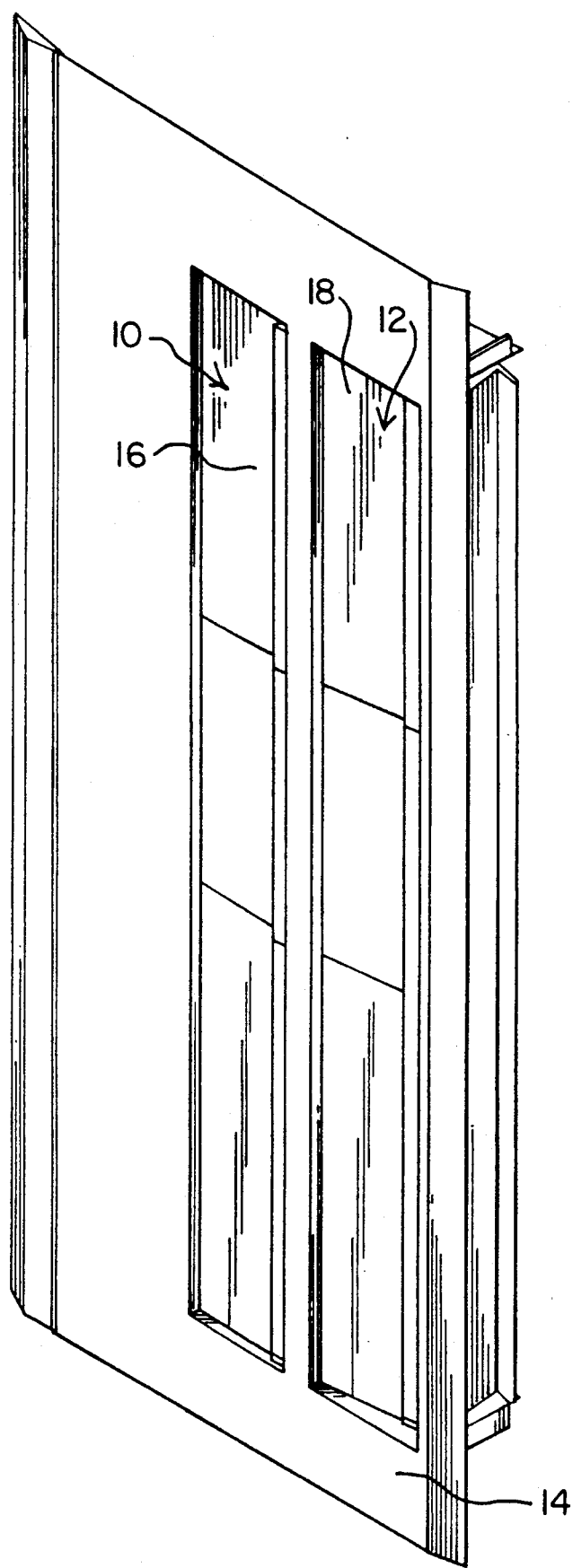
FIG. 1 is a perspective view of a cartridge access port.

Typically, tape cartridges are loaded into tape cartridge libraries through a device, such as a cartridge access port. The illustrative preferred embodiment has particular application in a cartridge access port, such as the cartridge access ports 10, 12, shown in FIG. 1. Cartridge access ports 10, 12 are formed in panel 14 of a tape cartridge library system (not shown). Cartridge access ports 10, 12 include vertically extending doors 16, 18 which open outward to allow access into the access ports 10, 12. Normally, doors 16, 18 remain inclosed except during cartridge loading and cartridge retrieval.

Figure 2:
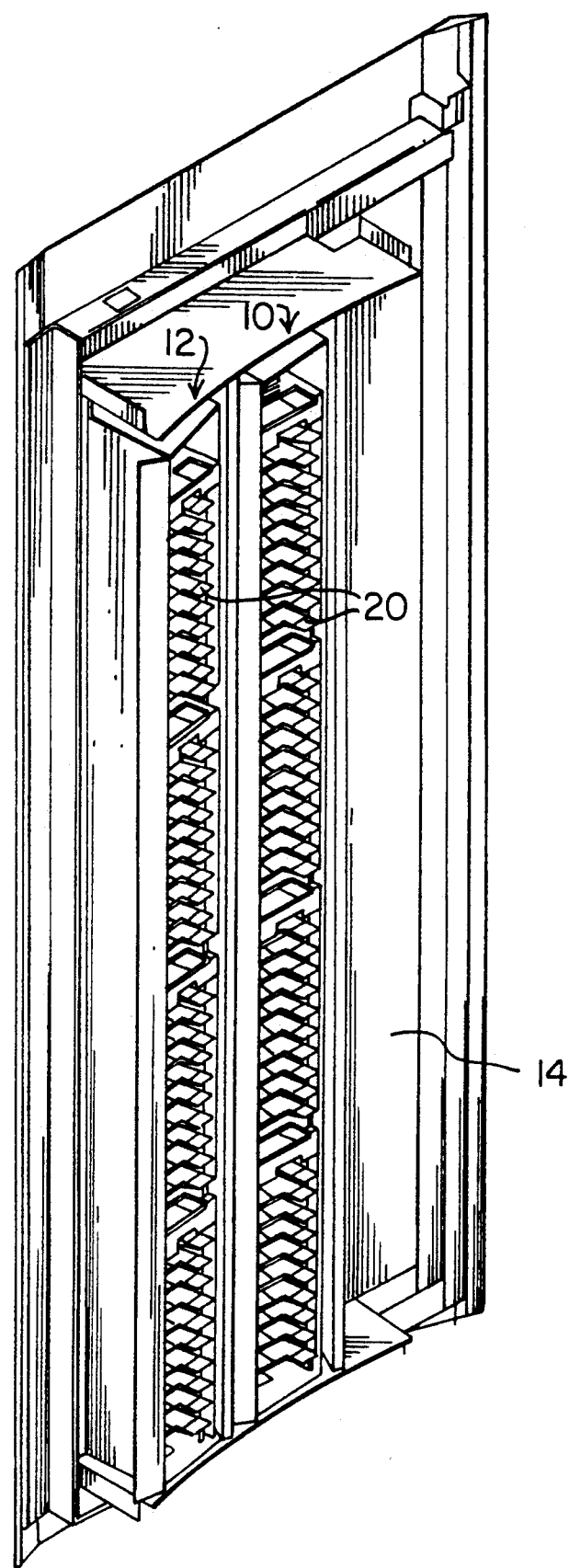
FIG. 2 is a rear perspective view of the cartridge access port of FIG. 1 with the magazines of the present invention loaded therein.

Cartridge access ports 10, 12 extend through panel 14, shown in FIG. 2, into the interior of the tape cartridge library (not shown). Magazines 20 of the illustrative preferred embodiment, are hung vertically above one another in cartridge access ports 10, 12 with slots 22 opening outwardly. Tape cartridges are contained in slots 22, as discussed below, to be accessible for the robotics (not shown) of the library system.

Figure 3:
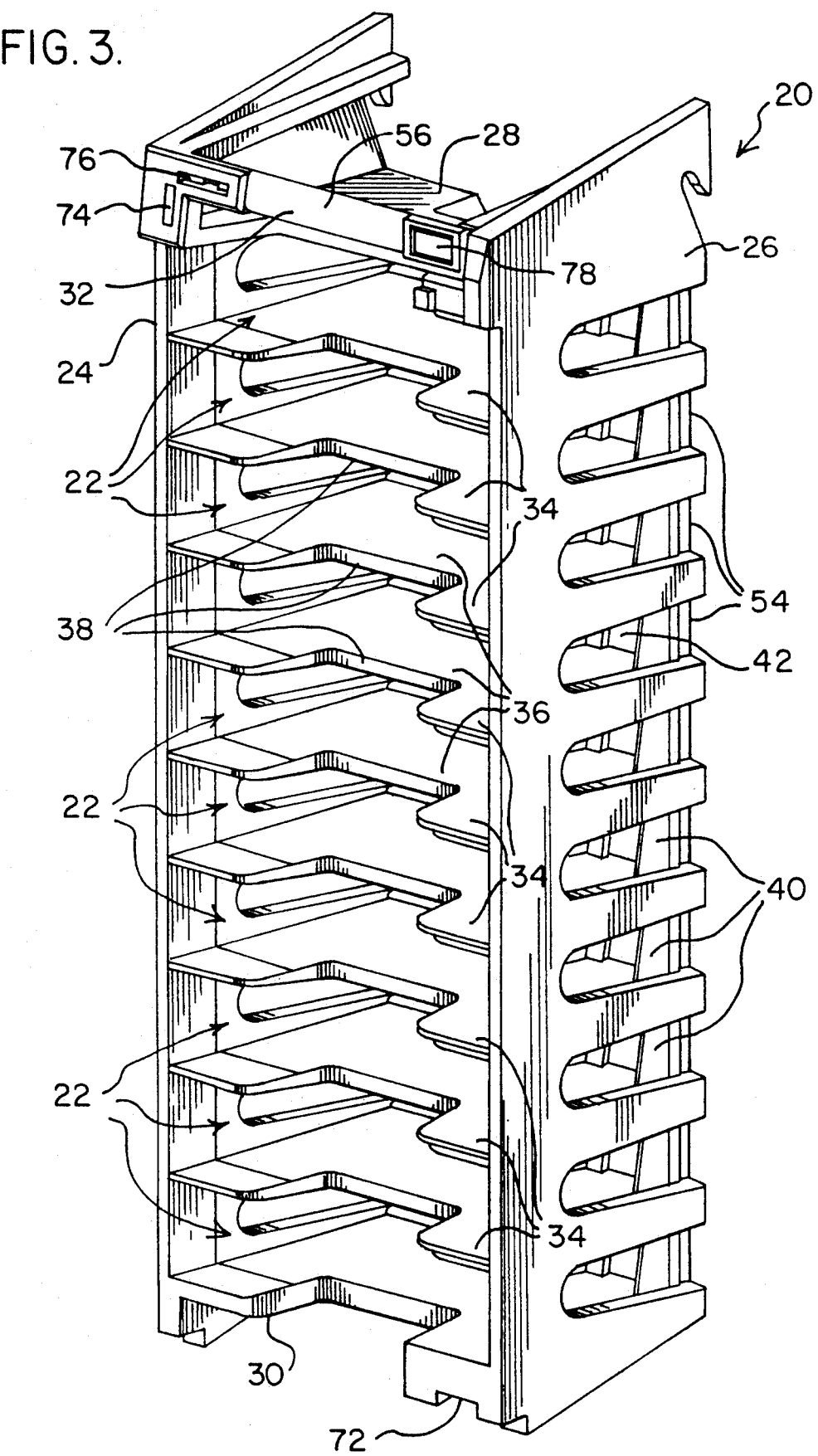
FIG. 3 is a front perspective view of a preferred embodiment of the magazine of the present invention.
Figure 4:
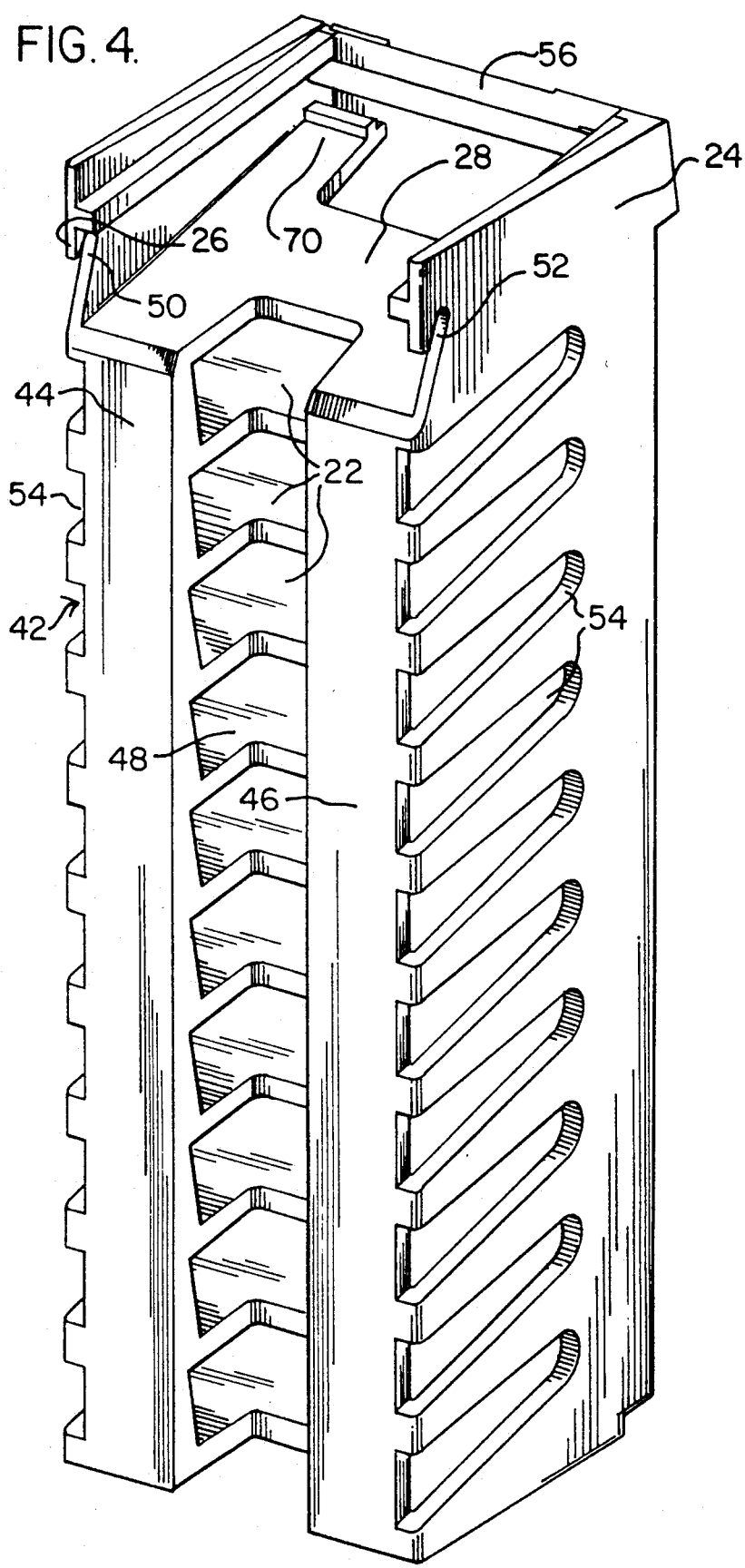
FIG. 4 is a rear perspective view of the embodiment of FIG. 3.

Magazine 20, shown in FIGS. 3 and 4, is a substantially rectangularly shaped structure formed of an injection molded plastic. In the preferred embodiment, magazine 20 is a one-piece injection molded polycarbonate structure having high impact resistance as well as superior wear resistance. However, other materials and manufacturing process are considered to be within the claimed inventive concept. Magazine 20 is preferably black or a dark color to provide contrast with the white targets, discussed below, and white cartridge labels for the optical sensing devices in the robotics of many tape cartridge libraries.

Opposing side walls 24, 26 extend vertically beyond upper end 28 and lower end 30. Front wall 32 is substantially open as well. A series of spaced, parallel shelves 34 extend between side walls 24, 26 to form slots 22 for holding the tape cartridges. The width, height and depth of slots is chosen to accommodate the size of standard data storage tape cartridges. The illustrative preferred embodiment shows ten slots 22. However, the claimed invention is not meant to be limited to the number and configuration of cartridge holding slots. The number and configuration of the slots can be varied as desired within the scope of the claimed invention.

Front edge 36 of shelves 34 is substantially horizontal to form a stable platform for the insertion of the tape cartridges in slots 22. Shelves 34 beyond front edge 36 slant downward, at about a ten degree angle, so the tape cartridges are precisely positioned due to the forces of gravity and also to restrain the tape cartridges from accidentally falling out of magazine 20. This downward slant of slots 22 also creates a "funnel" effect to assist in loading the tape cartridges in magazine 20.

Notches 38 are formed centrally in each shelf 34 to provide clearance for the robotics to grasp the tape cartridges. This clearance also allows manual removal of the tape cartridges from the magazine. Front edge 36 of each shelf 34 is tapered to provide additional clearance and also to enhance the "funnel" effect of slots 22. Upper end 28 and lower end 30 also slant downward to form a mating surface for the upper most slot and lower most slot. Notches 38 are also formed in upper end 28 and lower end 30 to provide ease of access for grasping the tape cartridges loaded therein.

Rib 40, shown in FIG. 3, extending vertically on the inside portion of rear wall 42 provides a "keying" feature to prevent misalignment of the tape cartridges in slots 22. When the tape cartridges are properly loaded into slots 22, a notch on the back of the tape cartridges will engage rib 40 so the tape cartridges will fully seat into slots 22. If the tape cartridges are inserted upside down, rib 40 will not engage in the tape cartridge notch and will prevent the tape cartridges from fully seating in slots 22. The improperly inserted tape cartridges will thus extend further out of the slots 22 than the properly inserted tape cartridges so they will be visibly detected.

Rear wall 42 of magazine 20, shown in FIG. 4, includes two vertical, parallel spaced sections 44, 46. Central area 48, between sections 44, 46, of rear wall 42 is open for two purposes. Primarily, the open area reduces the weight of magazine 20. Also, the tape cartridges can be quickly ejected by pushing the tape cartridges out of slots 22, if desired. Rear wall 42 has hook portions 50, 52 for mounting purposes in cartridge access ports 10, 12. Magazine 20 can be quickly mounted in cartridge access ports 10, 12 by inserting hooks 50, 52 over the mounting brackets (not shown) in cartridge access ports 10, 12.

Side walls 24, 26 include side slots 54 extending into rear wall 42. Side slots 54 also are provided for weight savings. Side slots 54 further allow visual checks from the side to identify any filled slots 22.

Handle 56 is formed in upper end of front surface 32. Magazine 20 is grasped at handle 56 to be lifted and transported. Lifting magazine 20 at handle 56 causes magazine 20 to tilt backwards due to the center of gravity of the magazine, particularly when fully loaded. The backward tilt of magazine 20 further restrains the tape cartridges from accidentally falling out of slots 22 when the magazine is being transported.

Figure 5:
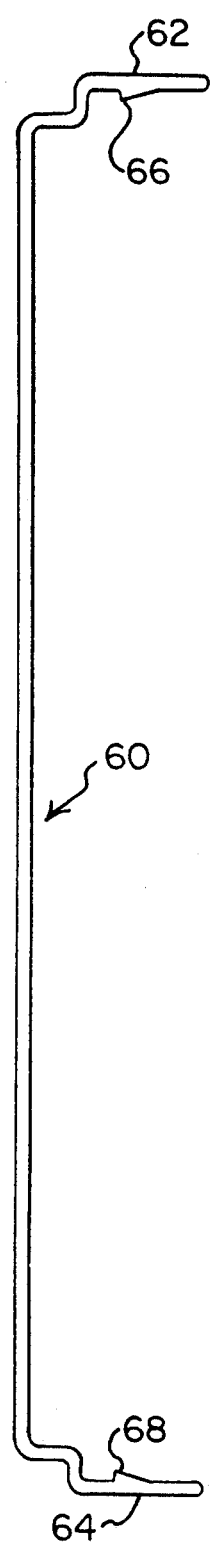
FIG. 5 is a side view of a locking strap for the magazine of the present invention.

Locking strap 60, shown in FIG. 5, is provided for further safeguards for tape cartridges loaded in magazine 20 during movement of the magazine. Strap 60 is a narrow elongated strap formed from a polycarbonate material having body portion with resilient end portions 62, 64 extending perpendicularly from body portion 66. Locking hooks 66, 68 are formed on end portions 62, 64, directed inwardly. Locking hooks 66, 68 engage in ledge portion 70 formed in upper end 28 of magazine 20 and ledge portion 72 formed in lower end 30 of magazine 20. The resilient action of end portions 62, 64 allow locking hooks 66, 68 to engage over ledge portions 70, 72 to lock strap 60 over the front surface of slots 22 to prevent the tape cartridges from accidentally falling out of magazine 20.

Target inserts 74, 76 are affixed to the upper end of front surface 32 to provide references to align the robotics of automated tape cartridge library systems. Typically, the robotics of automated tape cartridge library systems include optical sensing devices which scan the target inserts 74, 76 to align the tape cartridge retrieval mechanism of the robotics relative to the magazine. Target inserts 74, 76 are arranged perpendicularly to one another to provide vertical and lateral alignment references so the robotics can be precisely aligned to access the tape cartridges in magazine 20. Magazine 20 includes slots (not shown) for target inserts 74, 76 to be removably affixed therein. Target inserts 74, 76 encounter substantial abrasive use and tend to become worn down so that the optical sensing devices on the robotics may not readily identify them. Therefore, target inserts 74, 76 may be easily replaced as the need arises. Target inserts 74, 76 are preferably of a white or light color to contrast against the black or dark color of magazine 20.

A second target 78 is provided on front surface 32 of magazine 20. Target 78 is provided to provide a reference for other types of optical sensing devices used in automated tape cartridge systems. The function of target 78 is similar to the above described target inserts 74, 76.

Tape cartridges are initially inserted into slots 22 of magazine 20. The tape cartridges can be sequentially arranged as desired. If any cartridges are inserted upside down, then rib 40 will cause the misaligned cartridges to not fully seat in their slots. A quick visual check will determine whether any of the tape cartridges were inserted incorrectly. Once all of the loaded tape cartridges are correctly inserted, then strap 60 can be locked into place by extending locking portions 66, 68 over ledges 70, 72 on magazine 20 to prevent the tape cartridges from falling out of magazine 20. Magazine 20 can be lifted by handle 56 to be transported. The magazine will tilt backwards to further prevent the tape cartridges from falling out of magazine 20.

The tape cartridges can then be loaded into the tape cartridge library through cartridge access ports 10, 12. Doors 16, 18 are opened and loaded magazines 20 inserted therein by securing hook portions 50, 52 over mounting brackets in access ports 10, 12 to secure the magazines therein. Strap 60 is removed and doors 16, 18 closed. Normally, cartridge access ports 10, 12 will rotate the magazines so front surface 32 of the magazine faces the interior of the library so the tape cartridges can be accessed by the library system.

The optical sensing device on the robotics will align the tape cartridge retrieval mechanism with the magazines by referencing target inserts 74, 76 or target 78. The tape cartridge retrieval mechanism then grasps the selected tape cartridge to retrieve or load a tape cartridge from slot 22 of magazine 20. Front edge 36, notches 38 and the downward slant of slots 22 all cooperate to assist in loading and retrieving of the tape cartridges in the slots.

The tape cartridges are retrieved from the library in a similar fashion. The magazines are rotated by cartridge access ports 10, 12 so front surface 32 of the magazine faces doors 16, 18 which may then be opened. Strap 60 is locked onto magazine 20 and the magazine is lifted by handle 56 from over the mounting brackets of the cartridge access ports.

The present invention provides a magazine for transporting tape cartridges as well as loading and unloading tape cartridges into tape cartridge libraries. The above descriptive preferred embodiment is for illustrative purposes only and is not meant to limit the claimed invention. Other embodiments and modifications are considered to be within the scope of the claimed inventive concept.

We claim:

1. A magazine for tape cartridges, said magazine comprising:

a plurality of slot means for holding tape cartridges;

means on said slot means for accurately positioning said tape cartridges in said magazine;

means on said magazine for restraining said tape cartridges loaded in said slot means from accidental dislodgement from the magazine; and reference means affixed on said magazine for aligning tape cartridge handling means in automated tape cartridge library systems.

2. The magazine of claim 1 wherein said magazine includes:

a substantially rectangular structure having a substantially open front face; and a plurality of vertically spaced, parallel shelves forming said slot means.

3. The magazine of claim 1 wherein said slot means include a plurality of spaced, parallel shelves forming said slot means; and said positioning means include said slot means having a downward slant so said tape cartridges are precisely positioned by the force of gravity.

4. The magazine of claim 1 wherein said positioning means include a rib formed at the rear of said slot means for engagement with a notch on the rear of said tape cartridges when said tape cartridges are properly inserted in said slot means.

5. The magazine of claim 1 wherein said slot means include a plurality of spaced, parallel shelves; and said restraining means include said slot means having a downward slant so that said tape cartridges are restrained from accidental dislodgement by the forces of gravity.

6. The magazine of claim 1 wherein said reference means include removable inserts for replacement when worn or obscured.

7. The magazine of claim 1 wherein said magazine further comprises means for mounting said magazine directly into tape cartridge library systems.

8. The magazine of claim 1 wherein said restraining means includes a handle formed on the upper end of the front face of said magazine so that lower end of said magazine tilts forward when said magazine is lifted by said handle due to the center of gravity of said magazine to restrain said tape cartridges from accidental dislodgement.

9. The magazine of claim 1 wherein said slot means include a plurality of spaced, parallel shelves forming said slot means, and said insertion means include notches formed on the front edge of said shelves to provide clearance for insertion and removal of said tape cartridges.

10. The magazine of claim 1 wherein said slot means include a plurality of spaced, parallel shelves forming said slot means, and said insertion means include tapered front edges on said shelves to create a funnel-like insertion area on said slot means.

11. The magazine of claim 1 wherein said reference means include reference means perpendicularly aligned relative to each other to align said tape cartridge handling means laterally and vertically.

12. A magazine for tape cartridges, said magazine comprising:

a plurality of slot means for holding tape cartridges;

means on said slot means for accurately positioning said tape cartridges in said magazine;

means on said magazine for restraining said tape cartridges loaded in said slot means from accidental dislodgement from the magazine including a locking strap across said slot means to prevent said tape cartridges from accidental dislodgement.

13. The magazine of claim 12 wherein said locking strap includes a body portion, end portions extending substantially perpendicular from said body portion, and locking hooks formed on said end portions for engagement with locking means on said magazine.

14. A magazine for tape cartridges, said magazine comprising:

a plurality of spaced, parallel shelves forming slots for holding tape cartridges;

said shelves having a downward slant to provide means for precisely position said tape cartridges due to the force of gravity and means for restraining said cartridges from accidental dislodgement from said slots due to the force of gravity;

said shelves including tapered front edges to create a funnel-like insertion area on said slots for insertion of said tape cartridges in said slots;

notches formed in said front edges for clearance in inserting and retrieving said tape cartridges in said slots; and a locking strap having resilient end portions and locking means formed on said end portions for engagement with locking means on said magazine for attaching said locking strap across said slots of said magazine to prevent said tape cartridges from accidental dislodgement.

15. A magazine for tape cartridges, said magazine comprising:

a plurality of spaced, parallel shelves forming slots for holding tape cartridges;

said shelves having a downward slant to provide means for precisely position said tape cartridges due to the force of gravity and means for restraining said cartridges from accidental dislodgement from said slots due to the force of gravity;

said shelves including tapered front edges to create a funnel-like insertion area on said slots for insertion of said tape cartridges in said slots;

notches formed in said front edges for clearance in inserting and retrieving said tape cartridges in said slots; and reference means affixed on said magazine for aligning tape cartridge handling means laterally and vertically relative to said magazine.

16. The magazine of claim 15 wherein said magazine further comprises a rib formed in each slot for engagement with a notch on said tape cartridges when said tape cartridges are properly inserted in said slots.

17. The magazine of claim 15 wherein said magazine further includes a handle formed on the upper end of the front face of said magazine so that the lower end of said magazine pivots forward when said magazine is lifted by said handle due to the center of gravity of said magazine to restrain said tape cartridges from accidental dislodgement from said magazine.

18. The magazine of claim 15 wherein said reference means include removable inserts.

* * * * *